US012774709B2

(12) United States Patent
Peterson et al.

(10) Patent No.: US 12,774,709 B2
(45) Date of Patent: Oct. 27, 2026

(54) FLUSH-MOUNT FAN GRILLE

(71) Applicant: Broan-NuTone LLC, Hartford, WI (US)

(72) Inventors: Jared Peterson, West Bend, WI (US); Ryan A. Revers, Hartland, WI (US); Richard R. Sinur, West Bend, WI (US)

(73) Assignee: Broan-NuTone LLC, Hartford, WI (US)

( * ) Notice: Subject to any disclaimer, the term of this patent is extended or adjusted under 35 U.S.C. 154(b) by 0 days.

(21) Appl. No.: 19/023,645

(22) Filed: Jan. 16, 2025

(65) Prior Publication Data

US 2025/0163939 A1 May 22, 2025

Related U.S. Application Data

(63) Continuation of application No. 17/349,199, filed on Jun. 16, 2021, now Pat. No. 12,228,149.

(Continued)

(51) Int. Cl.
*F04D 29/70* (2006.01)
*F04D 29/60* (2006.01)
*F21V 33/00* (2006.01)

(52) U.S. Cl.
CPC ......... *F04D 29/703* (2013.01); *F04D 29/602* (2013.01); *F21V 33/0096* (2013.01)

(58) Field of Classification Search
CPC ............. F21V 33/0096; F21V 33/0088; F04D 29/703; F04D 29/602; F04D 29/624; F04D 17/16; F04D 25/08; F05D 2260/38
See application file for complete search history.

(56) References Cited

U.S. PATENT DOCUMENTS

| | | | |
|---|---|---|---|
| 1,943,298 A | 1/1934 | Cunningham et al. | |
| 1,986,823 A | 1/1935 | Jones et al. | |

(Continued)

FOREIGN PATENT DOCUMENTS

| | | | | |
|---|---|---|---|---|
| KR | 101713528 B1 * | 3/2017 | .............. F21V 29/61 | |
| KR | 101990831 B1 * | 6/2019 | .......... F21V 33/0088 | |

OTHER PUBLICATIONS

Publically available flush mount light fixture, retreived 2025 <https://www.homedepot.com/p/Hampton-Bay-Flaxmere-12-in-Modern-Matte-Black-Selectable-3-CCT-Integrated-LED-Flush-Mount-for-Kitchens-or-Bedrooms-HB1023C3CCT-43/328916275#overlay> (Year: 2025).*

(Continued)

*Primary Examiner* — Ryan C Clark
(74) *Attorney, Agent, or Firm* — Hansen Reynolds LLC

(57) ABSTRACT

A flush-mounted, in-ceiling exhaust fan grille for attachment to an exhaust fan housing includes a planar integration flange forming a perimeter of the grille. The integration flange includes a plurality of through holes along the perimeter. An insert may be configured for insertion within the perimeter of the integration flange. A light module may be configured to join within a central portion of the insert while maintaining an opening between an entirety of the light module and the insert. At least one spring may be attached to the insert on a first end and attached to the fan housing on a second end, wherein the at least one spring applies a force drawing the insert towards the fan housing. An exhaust fan may be provided to draw air into the fan housing through the opening between the light module and the insert to be exhausted for proper ventilation.

20 Claims, 12 Drawing Sheets

Related U.S. Application Data

(60) Provisional application No. 63/047,332, filed on Jul. 2, 2020.

(56) References Cited

U.S. PATENT DOCUMENTS

| | | | | |
|---|---|---|---|---|
| 3,327,609 | A | 6/1967 | Sage et al. | |
| 3,504,648 | A | 4/1970 | Rosner | |
| 5,664,872 | A * | 9/1997 | Spearman | F24F 13/078 362/373 |
| 6,551,185 | B1 * | 4/2003 | Miyake | F24F 7/10 454/233 |
| 7,232,369 | B2 | 6/2007 | Karidis et al. | |
| 7,537,253 | B2 | 5/2009 | Rosen et al. | |
| 7,771,259 | B2 | 8/2010 | Pettit | |
| 7,819,730 | B2 | 10/2010 | Ascroft | |
| 7,993,434 | B2 | 8/2011 | Oscar | |
| 8,343,244 | B2 | 1/2013 | Sakashita | |
| 9,024,186 | B1 | 5/2015 | Gonzalez et al. | |
| 9,175,464 | B2 | 11/2015 | Meyers | |
| 9,459,039 | B2 | 10/2016 | Koike et al. | |
| 9,574,815 | B2 | 2/2017 | Ikeda et al. | |
| 9,644,862 | B1 | 5/2017 | Korte | |
| 9,702,576 | B2 | 7/2017 | Avedon | |
| 9,726,395 | B2 | 8/2017 | Hammer | |
| 9,765,988 | B2 * | 9/2017 | Bruhnke | F24F 13/082 |
| 9,777,475 | B1 | 10/2017 | Yasinskiy | |
| 10,041,691 | B2 | 8/2018 | Fujita | |
| 10,203,124 | B2 | 2/2019 | Jeong | |
| 10,240,805 | B2 | 3/2019 | Nouchi et al. | |
| 10,365,007 | B2 | 7/2019 | Fujita et al. | |
| 10,641,518 | B2 | 5/2020 | Kennedy | |
| 10,801,743 | B2 | 10/2020 | Zakula et al. | |
| 10,928,094 | B2 | 2/2021 | Mazzuca et al. | |
| 11,079,124 | B1 | 8/2021 | Mathews | |
| 11,181,296 | B2 | 11/2021 | Regnier | |
| 11,313,581 | B2 | 4/2022 | Yaciuk | |
| 11,378,301 | B2 | 7/2022 | Zauderer | |
| 11,441,299 | B2 | 9/2022 | English | |
| 11,460,216 | B2 | 10/2022 | Carroll | |
| 11,499,708 | B2 | 11/2022 | Huang et al. | |
| 11,744,378 | B2 | 9/2023 | Van Doornewaard | |
| 2008/0166232 | A1 * | 7/2008 | Pearce | F04D 29/703 415/220 |
| 2008/0188175 | A1 | 8/2008 | Wilkins | |
| 2010/0029194 | A1 | 2/2010 | Fiedler | |
| 2011/0198404 | A1 | 8/2011 | Dropmann | |
| 2012/0087128 | A1 * | 4/2012 | Zakula | F24F 13/078 362/249.02 |
| 2012/0087132 | A1 * | 4/2012 | Zakula | F21V 23/003 362/373 |
| 2015/0031282 | A1 | 1/2015 | Nagan | |
| 2016/0273797 | A1 * | 9/2016 | Bruhnke | F24F 13/084 |
| 2017/0307250 | A1 * | 10/2017 | Berneth | F24F 7/10 |
| 2018/0045204 | A1 * | 2/2018 | Van Grootheest | F21V 33/0096 |
| 2018/0066838 | A1 * | 3/2018 | Huang | F21S 8/026 |
| 2018/0347574 | A1 * | 12/2018 | Niemiec | F21V 9/08 |
| 2019/0072288 | A1 * | 3/2019 | Niemiec | E04B 9/02 |
| 2019/0113221 | A1 * | 4/2019 | Huang | F24F 7/065 |
| 2019/0277520 | A1 * | 9/2019 | Zakula | F24F 13/078 |
| 2020/0158122 | A1 * | 5/2020 | Huang | F21S 8/026 |
| 2021/0131698 | A1 | 5/2021 | Bruhnke et al. | |
| 2022/0140586 | A1 | 5/2022 | Pike | |
| 2023/0168003 | A1 | 6/2023 | Tang et al. | |
| 2023/0296283 | A1 | 9/2023 | Benkowski | |

OTHER PUBLICATIONS

Collin's Dictionary, Flush, 2025 https://www.collinsdictionary.com/us/dictionary/english/flush (Year: 2025).*
"Trimless LED," accessed online at: shorturl.at/fhBR8.
"id+ 3.5" round trimless adjustable," accessed online at: shorturl.at/fqyG8.
"Archproducts Astro Lighting Trimless Twin," accessed online at: shorturl.at/blmM0.
"Alcon 14006 Illusione Trimless 3-inch Architectural Direct LED Recessed Fixture," accessed online at: shorturl.at/epNT2.
"Aria Drywall Pro X [Exhaust Fan]," accessed online at: shorturl.at/uyCSU.
"Best Access Doors 4"x10" Premium Flush Mounted Vent & Grille Cover—Removable Wall and Ceiling Vent," accessed online at: shorturl.at/sMQY2.
"Best Access Doors 16"−16" Drywall Inlay Panel with Mud in Flange—Detachable," accessed online at: shorturl.at/gsSX9.
"INVI 1 Slot Square Diffuser with Light," accessed online at: shorturl.at/ktBLU.
"Architectural Grille Spackle In J-Frame Grilles," accessed online at: shorturl.at/ruPWZ.
"Venezina LED Down Light," accessed online at: shorturl.at/sAB19.
"StarlandLed 5-Pack 6.6FT/2 Meter Plaster-in Recessed Slim LED Aluminum Channel with Flange for LED Strip, Aluminum LED Profile with Clip-in Diffuser and End Caps," accessed online at: shorturl.at/IFJOX.
"ID+ 3.5" Family Downlights," accessed online at: shorturl.at/kqrl2.
"Cobra Wing Stand," accessed online at: shorturl.at/anJ39.
"Oracle Lighting Recessed Linear Instruction Manual," accessed online at: shorturl.at/cjnyX.
"Premium Flush Mounted Vent & Grill Covers," accessed online at: shorturl.at/ouwL8.

* cited by examiner

FLUSH-MOUNT FAN GRILLE

PRIORITY

This application claims benefit under 35 U.S.C. § 119(e) to U.S. Utility application Ser. No. 17/349,199, filed Jun. 16, 2021, and U.S. Provisional Application Ser. No. 63/047,332, filed Jul. 2, 2020, which is expressly incorporated by reference herein and made a part hereof.

TECHNICAL FIELD

The present disclosure relates to exhaust fan grilles. More particularly, the present disclosure relates to an exhaust fan grille for use in air ventilation system, such as bathroom exhaust fans, where the grille is integrated into the wall board for a seamless and flush installation.

BACKGROUND

Conventional ventilation exhaust fans are typically installed in the ceiling behind the wall board, normally drywall, of a room. In order to affix the fan into the ceiling, a hole is roughly cut with the use of a saw. After the fan is secured within the hole, a grille that serves an aesthetic function, as well as directing proper air flow through the fan, may be attached. The grille allows for a rough-cut of the wall board to be concealed. The grille also conceals the industrial, and mechanical look of the fan with a more finished look complimentary of a residential room.

As housing design trends continuously evolve and modernize, different grille designs are created to match these trends. A minimalist design trend seeks to minimize the impact of accessories in a room. It is desirable to have any added features blend into the room without drawing unwanted attention. Known fan grilles project from the wall, thereby creating focal points on the ceiling. What is therefore needed is an updated grille design for modern architecture. What is also needed is a grille that seamlessly blends into the architecture of a room without drawing attention. Lastly, what is needed is a grille with a modern look that also mounts flush with the ceiling.

A full discussion of the features and advantages of the present disclosure is deferred to the following Detailed Description section, which includes reference to the accompanying drawings.

The description provided in the background section should not be assumed to be prior art merely because it is mentioned in or associated with the background section. The background section may include information that describes one or more aspects of the subject technology.

SUMMARY

A flush-mounted, in-ceiling exhaust fan grille for attachment to an exhaust fan housing includes a planar integration flange forming a perimeter of the grille. The integration flange includes a plurality of through holes along the perimeter. An insert may be configured for insertion within the perimeter of the integration flange. A light module may be configured to join within a central portion of the insert while maintaining an opening between an entirety of the light module and the insert. At least one spring may be attached to the insert on a first end and attached to the fan housing on a second end, wherein the at least one spring applies a force drawing the insert towards the fan housing. An exhaust fan may be provided to draw air into the fan housing through the opening between the light module and the insert to be exhausted for proper ventilation.

The planar integration flange may be permanently attached to a wall board with a joint compound, also called wall board compound, thereby concealing the through holes along the perimeter.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the present disclosure. Additional components, different components, or fewer components may be utilized within the scope of the present disclosure.

DETAILED DESCRIPTION

Figure 1:
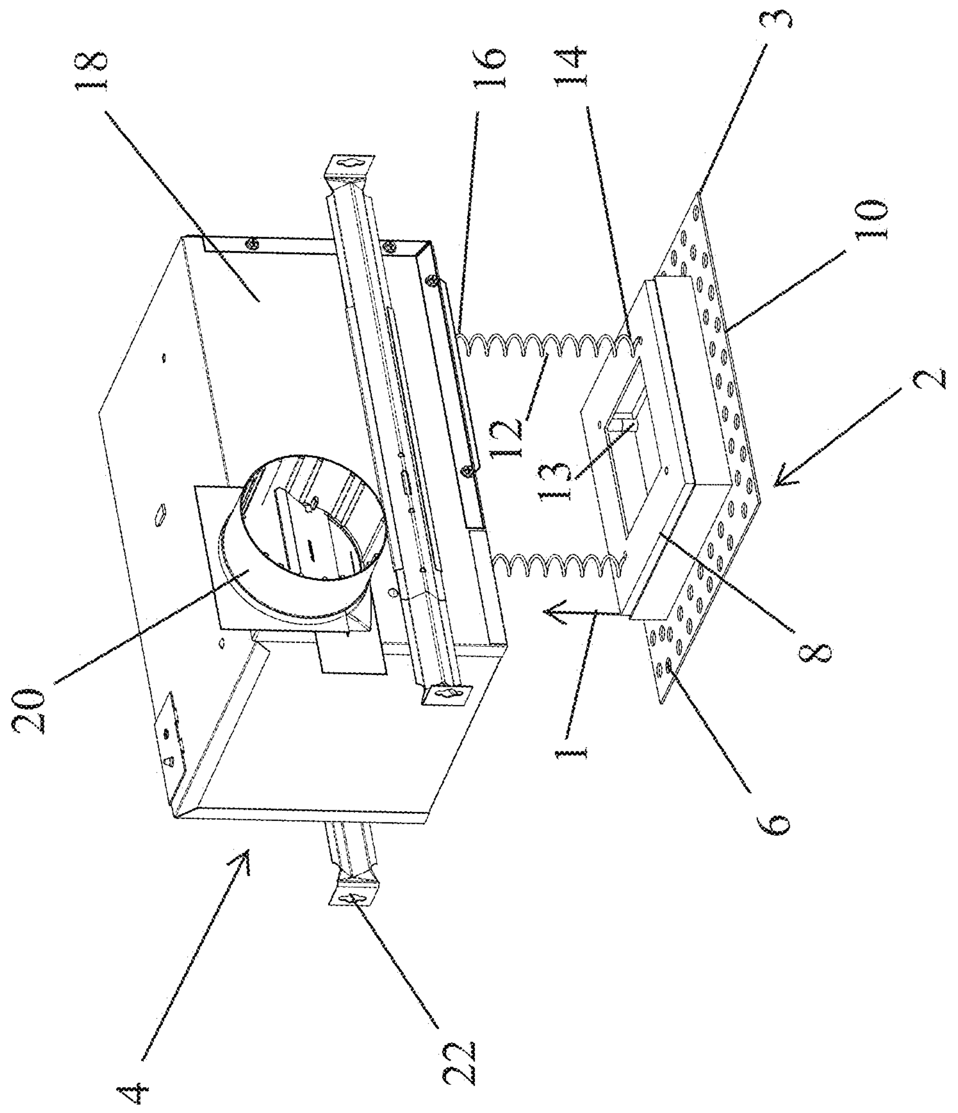
FIG. 1 is a lowered, perspective view of a first embodiment of the fan grille attached to an exhaust fan.
Figure 2:
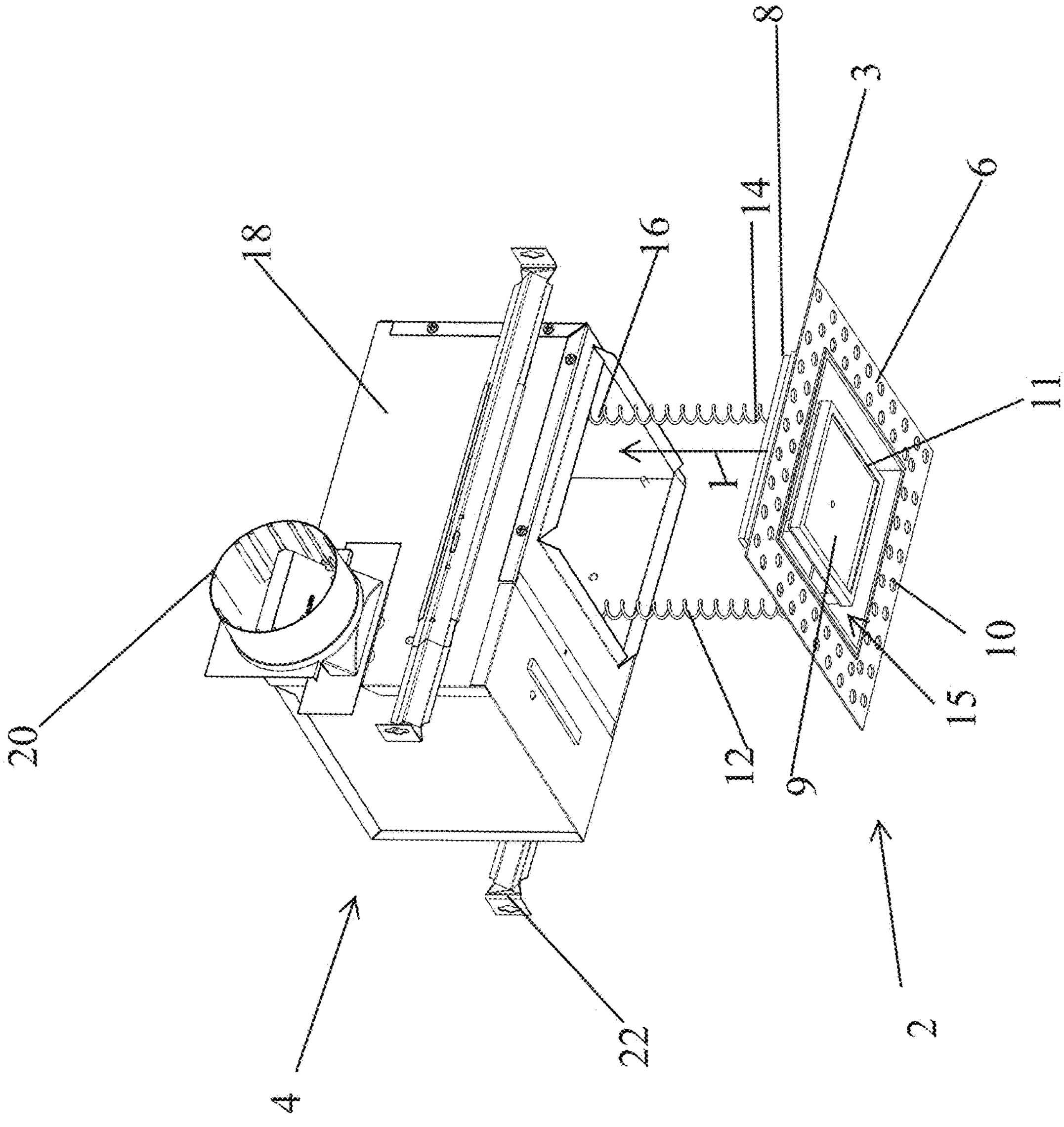
FIG. 2 is a raised, perspective view of the fan grille of FIG. 1.

Looking at FIGS. 1 and 2, a grille 2 is shown attached to a fan housing 18 of an exhaust fan 4 via springs 12. The springs 12 shown are extension springs, but any type of spring or device to apply a force 1 drawing the grille 2 towards the fan housing 18 may be used. The springs 12 attach to the grille by a first end 14 and attach to the fan housing 18 by a second end 16. While a pair of springs 12 are shown, any amount of springs 12 may be used. Alternatively, a fastener such as a bolt or threaded rod (not depicted) may be used to fasten the grille 2 to the fan housing 18.

The exhaust fan 4 includes the fan housing 18, the exhaust outlet 20 and mounting rails 22. The mounting rails 22 are telescoping to allow for varying joist spacing when mounting the exhaust fan 4 in a ceiling. Air is drawn into the exhaust fan housing 18 through the grille 2. The air is then exhausted out of the exhaust outlet 20.

Best seen in FIG. 2, the grille 2 is made up of various components including an integration flange 6, and insert 8, and a light module 9. The integration flange 6 has a plurality of through holes 10 about the perimeter 3. The through holes 10 allow the integration flange 6 to be bonded to wall board such as drywall.

Figure 3:
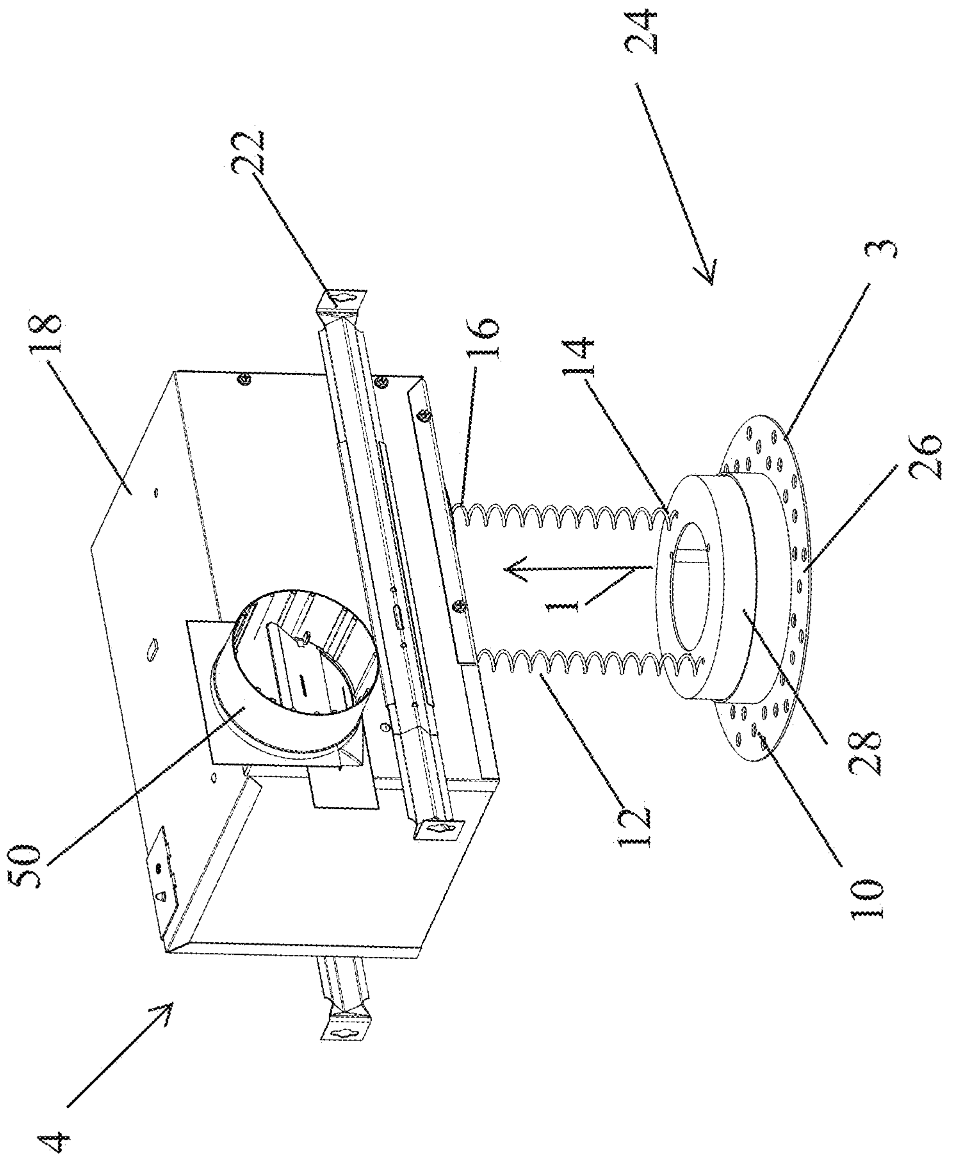
FIG. 3 is a lowered, perspective view of a second embodiment of the fan grille attached to an exhaust fan.
Figure 4:
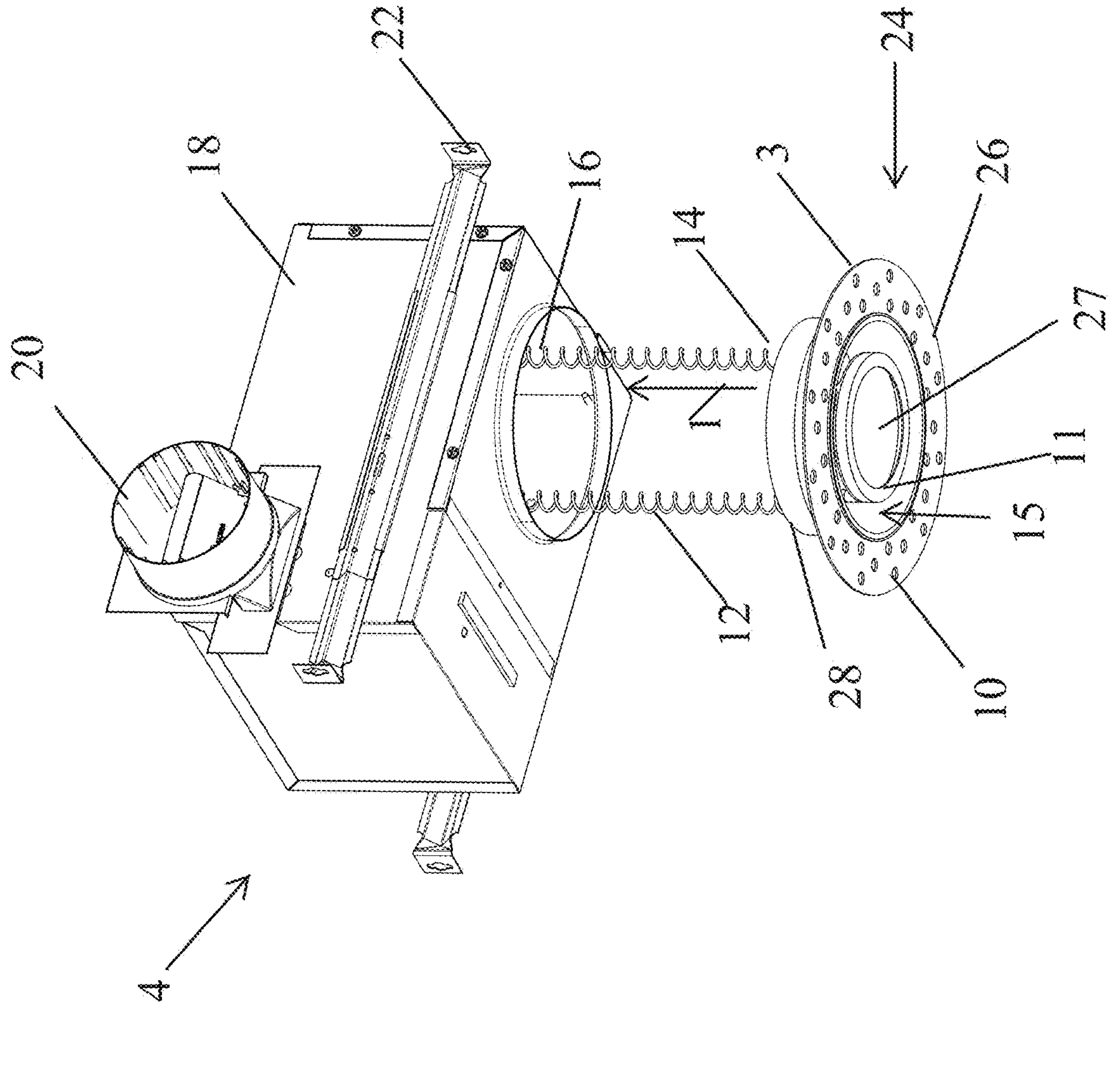
FIG. 4 is a raised, perspective view of the fan grille of FIG. 3.

During installation, drywall patching compound 5, commonly referred to as "mud", is spread on the wall board and into the through holes 10. After the compound 5 has dried/cured and been sanded smooth, the integration flange 6 is seamlessly bonded to the wallboard and visually hidden by the compound 5. This creates the appearance of a built-in grille without any housings or grilles protruding from the wall board. In other words, the grille 2 is totally flush and in the same plane as the surface of the wall board following installation. All that is seen following installation is the light module 9 and insert 8. The light module 9 is centrally located within the insert 8 thereby creating a space or opening 15. The opening 15 is uniform in size creating a gap between the light module 9 and the insert 8. The opening 15 shown in all embodiments create the necessary air flow path for drawing ambient air into the exhaust fan 4. The opening may be formed in other shapes as opposed to the shown perimeter surrounding the light module 9. For example, other openings for air flow could be a series of slots or in the center of the light module 9 with the light being emitted around the opening. Any number of configurations and geometry are possible. While the opening 15 incorporates an aesthetic element, it also obscures the internals within the fan housing 18 from view. Typical exhaust fans include louvres in the grille which provide openings that clearly display the internals within the fan housing. The invention disclosed herein does not show any internals of the fan housing 18 due to the geometry and placement of the opening 15 and light module 9. The opening 15 is functional as it creates an unobstructed path for air to be drawn into the fan housing 18. With the light module 9 being flush with the wall board, the grille 2 has a similar look to a mudded-in, recessed can light. This allows a user to hide the existence of the exhaust fan 4 and provides a more modern, minimalistic look. FIGS. 3 and 4 show a second embodiment of a grille 24 that incorporates all the features as the grille 2 shown in FIGS. 1 and 2, however it is cylindrical in shape as opposed to rectangular. For example, the grille 24 is made up of a cylindrical insert 28 with a round cross section and an integration flange 26 that is similarly round. All other parts shown in FIGS. 3 and 4 are the same as shown in FIGS. 1 and 2 with respect to shape and function. The round shape simply provides a user with a different option to match a desired aesthetic. In fact, any other shape could be made such as an oval or any sided polygon. The inserts 8 and 28 of all embodiments are removable by a user. This allows for serviceability of components within the fan housing 18 without destruction to a wall board 30 in which the exhaust fan 4 is installed.

Figure 5:
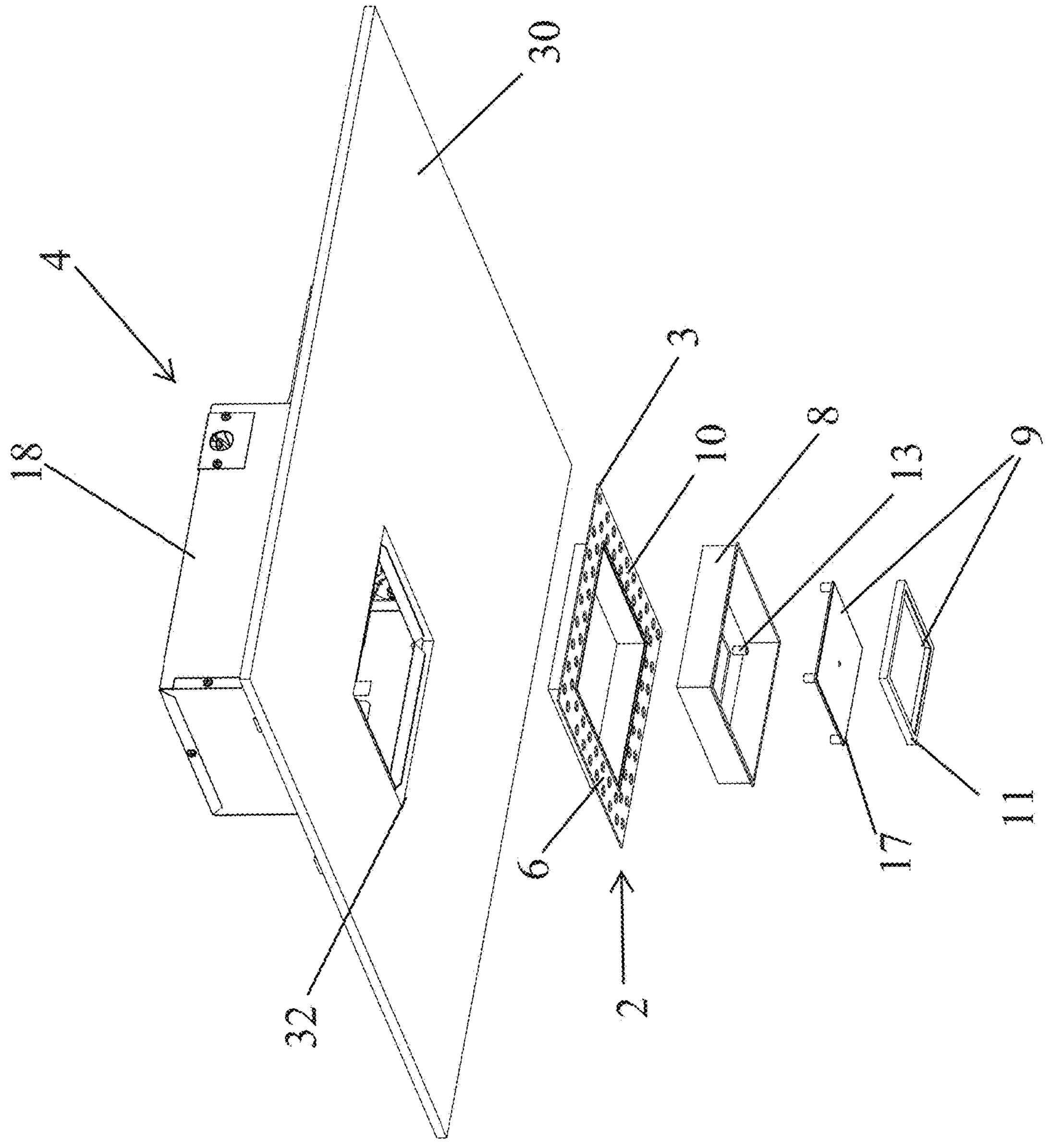
FIG. 5 is a partially exploded, lowered, perspective view of the fan grille of FIG. 1 partially installed in a ceiling.

Moving on to FIG. 5, the grille 2 of FIGS. 1 and 2 is shown partially exploded. Note the springs 12 are not shown for simplicity's sake. The grille 2 inserts into a cutout 32 provided in the wall board 30. When installing the grille 2 into the cutout 32, first the base of the integration flange 6 is inserted into the cutout 32. The cutout 32 should be similarly sized to the base of the integration flange 6 to allow for a snug insertion. After the through holes 10 are sufficiently covered with joint compound 5 and it is allowed to dry/cure, the insert 8 is inserted into the integration flange 6. Lastly, the light module 9 may be inserted into the insert 8. As previously discussed and shown in FIGS. 1-4, springs 12 pull the insert 8 and light module 9 into the integration flange 6 for a secure fit and retainment. The springs 12 also provide for vibrational dampening to prevent wall board compound 5 from cracking following installation (see FIGS. 9-12). The springs 12 suspend the fan housing 18 from all components of the grille 2 and 24. The springs 12 act to isolate the grilles 2 and 24 from fan vibrations as the spring will absorb any such vibrations without transferring them to the grille 2 and 24.

Figure 6:
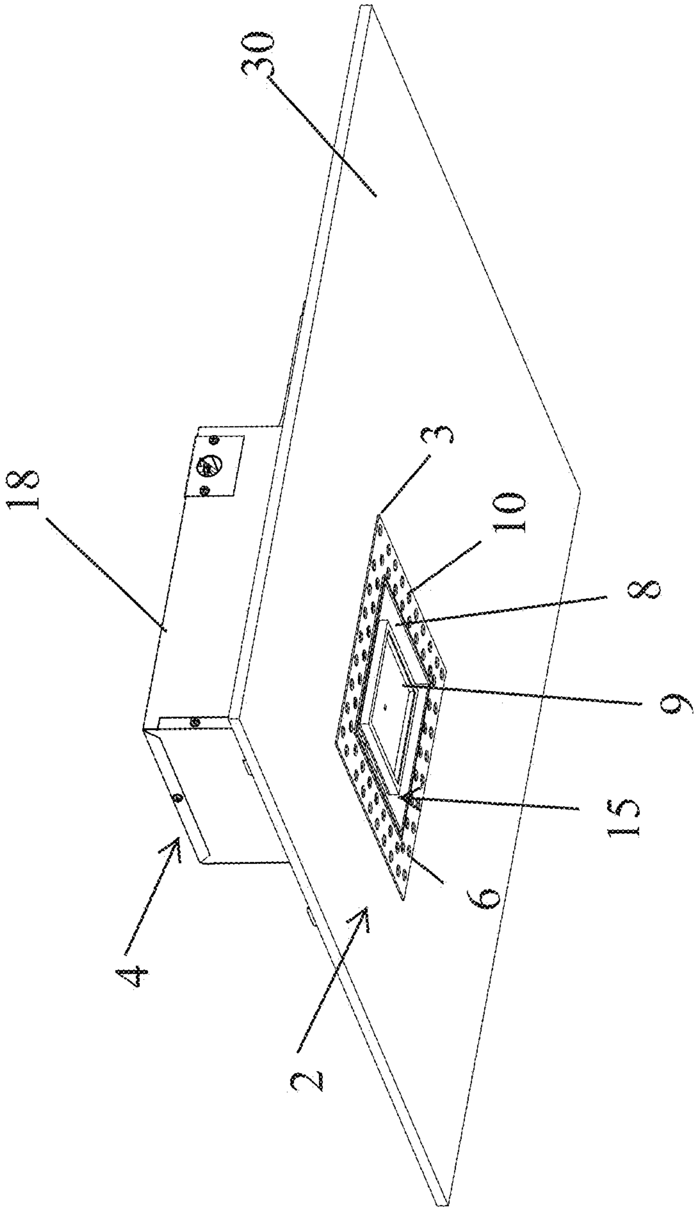
FIG. 6 is a lowered, perspective view of the fan grille of FIG. 1 partially installed in a ceiling.

After installment, the grille 2 appears as is shown in FIG. 6. Note, FIG. 6 omits the joint compound 5 application step to the integration flange 6 simply for illustrative purposes. As shown, the light module 9, integration flange 6, and the insert 8 are flush and in the same plane as the wall board 30.

The light module 9 is formed by a light PCB 17 and a trim ring 11. The light PCB 17 includes light emitting diodes, "LEDs" and may be provided in any shape. As shown in FIG. 5, the light PCB 17 is rectangular but may be provided in any shape at all. The trim ring 11 is affixed to the light PCB 17. Any fastener may be used to hold the trim ring 11 in place. For example, double sided tape may be used to attach the trim ring 11 to the light PCB 17. The shape of the light PCB 17 should, however, correspond to the insert 8. The insert 8 forms a housing for the light module 9 and provides a mounting point. A series of receivers 13 accept the light module 9 and affix it in place. The receivers 13 may feature a push-to-lock engagement, clips, tabs, screws, bolts, or the like simply providing a way for the light module 9 to attach and detach from the insert 8. Similarly, the insert 8 is designed to easily attach and detach from the integration flange 6. While the fastening materials are not shown, similar devices/features may be used. The integration flange 6, on the other hand, is not designed to easily detach from the wall board 30, it is a permanent installation that would require destructive means to remove such as damaging the wall board 30.

Figure 7:
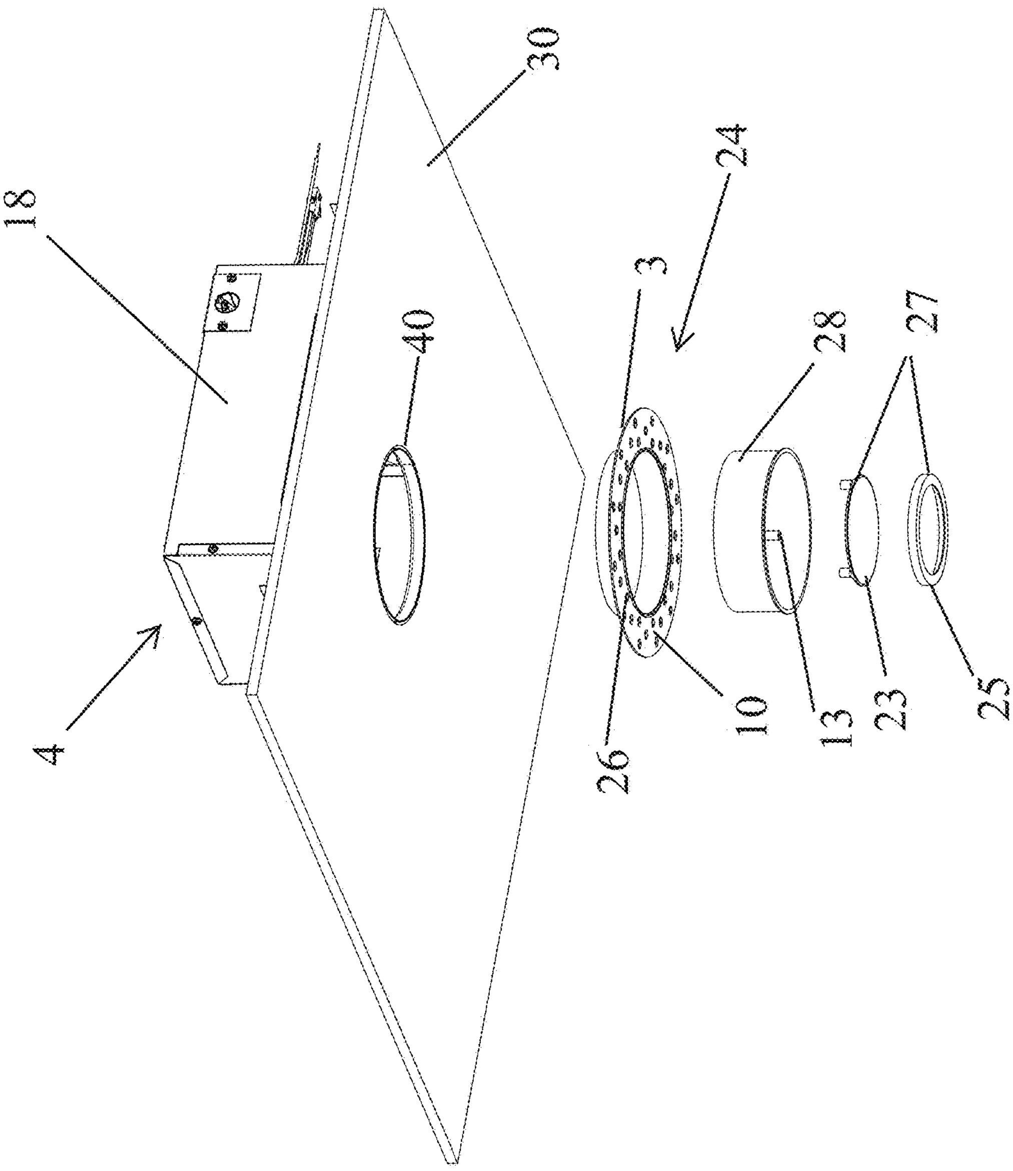
FIG. 7 is a partially exploded, lowered, perspective view of the fan grille of FIG. 3 partially installed in a ceiling.
Figure 8:
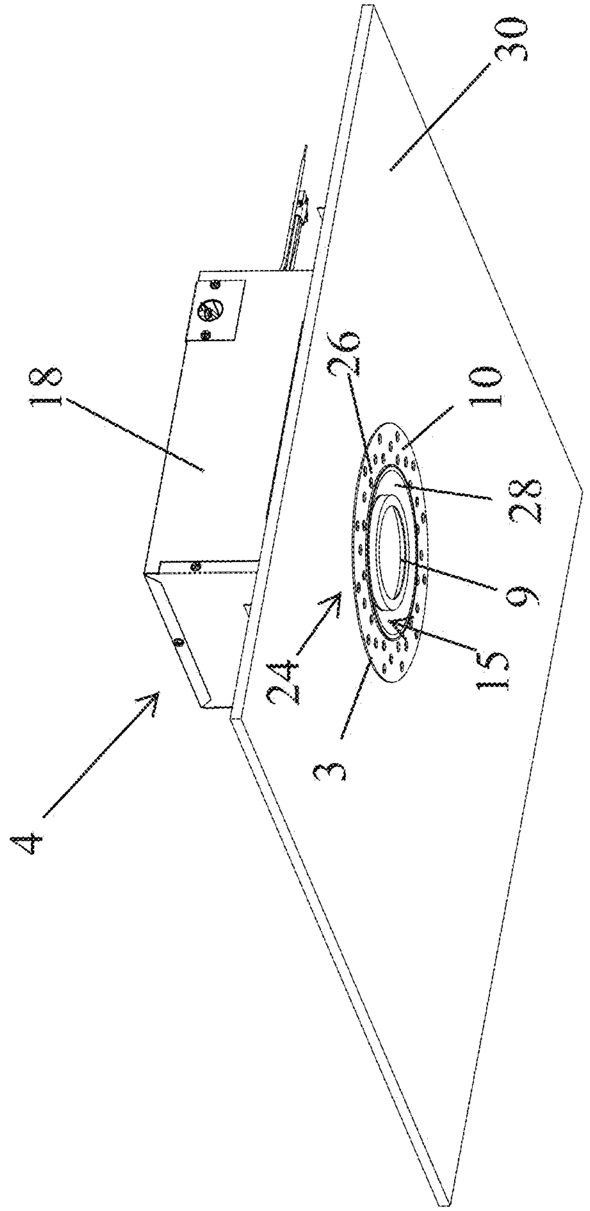
FIG. 8 is a lowered, perspective view of the fan grille of FIG. 3 partially installed in a ceiling.

FIGS. 7 and 8 show the same features and parts as FIGS. 5 and 6, except they are adapted for another embodiment with a round/cylindrical insert 28, light PCB 23, trim ring 25, light module 27 and integration flange 26. In order to accommodate the circular shape of the components, the cutout 40 in the wall board 30 also need to be cut to fit the various components. In this example, the cutout 40 is circular to allow the integration flange 26 and insert 28 to fit snugly within.

Figure 9:
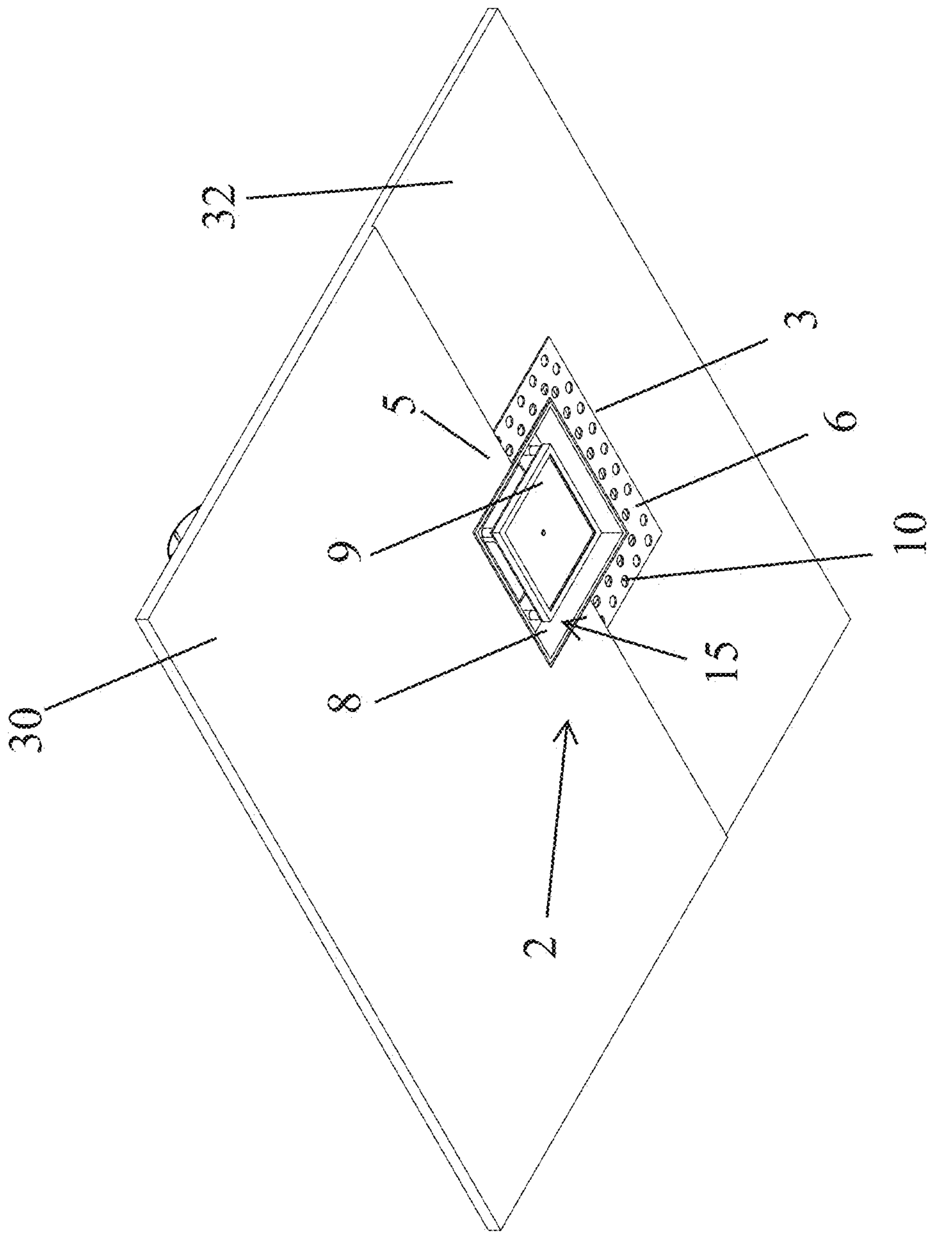
FIG. 9 is an inverted, perspective view of the fan grille of FIG. 1 partially installed in a ceiling.
Figure 10:
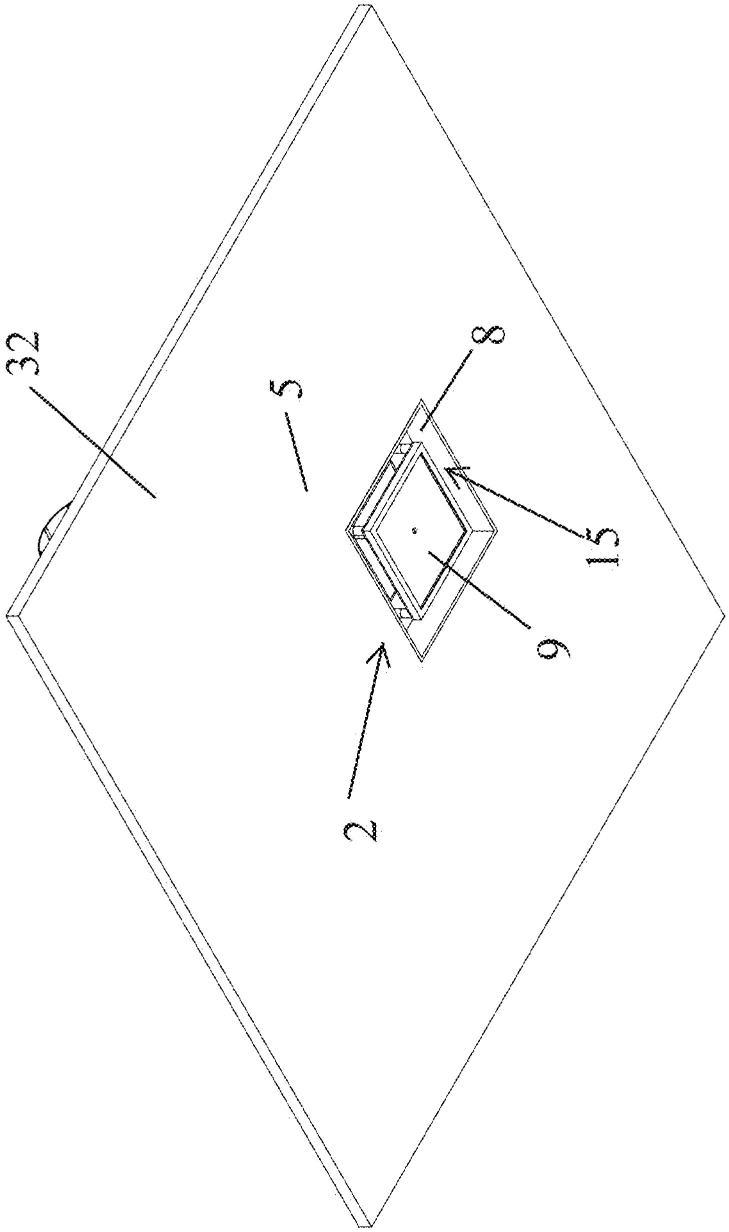
FIG. 10 is an inverted, perspective view of the fan grille of FIG. 1 fully installed in a ceiling.

FIGS. 9 and 10 show the installation process of the integration flange 6 being seamlessly integration with the wall board 30. As previously discussed, the grille 2 is inserted into a cutout 32 (shown in FIG. 5), and wallboard compound 5 is applied to the wallboard 30 to fill and cover the through holes 10 and perimeter 3 of the integration flange 6. While not shown, drywall tape may be used along the perimeter 3 of the integration flange 6 to prevent the wall board compound 5 from cracking during/after curing. FIG. 10 shows the complete and final appearance of the grille 2. Note the wall board 30 as shown in FIG. 9 has been covered with wall board compound 4 in order to blend in the through holes 10 and perimeter 3 of the integration flange 6. The final result is simply a transition from the wall board compound 5 to the opening 15. As previously discussed, the opening 15 is of uniform shape about the light module 9. This provides a uniform pathway for ambient air to be drawn into the fan housing 18, as shown in FIG. 5, for proper ventilation. Also shown is how the light module 9 is spaced within the insert 8 such that it is flush and even with the surface of the wall board 30 and wall board compound 5. Alternatively, the light module may be placed such that it protrudes out from the plane of the wall board 30 or is recessed within the wall board 30. The grille 2 allows for a variety of placement options for a fully integrated installation.

Figure 11:
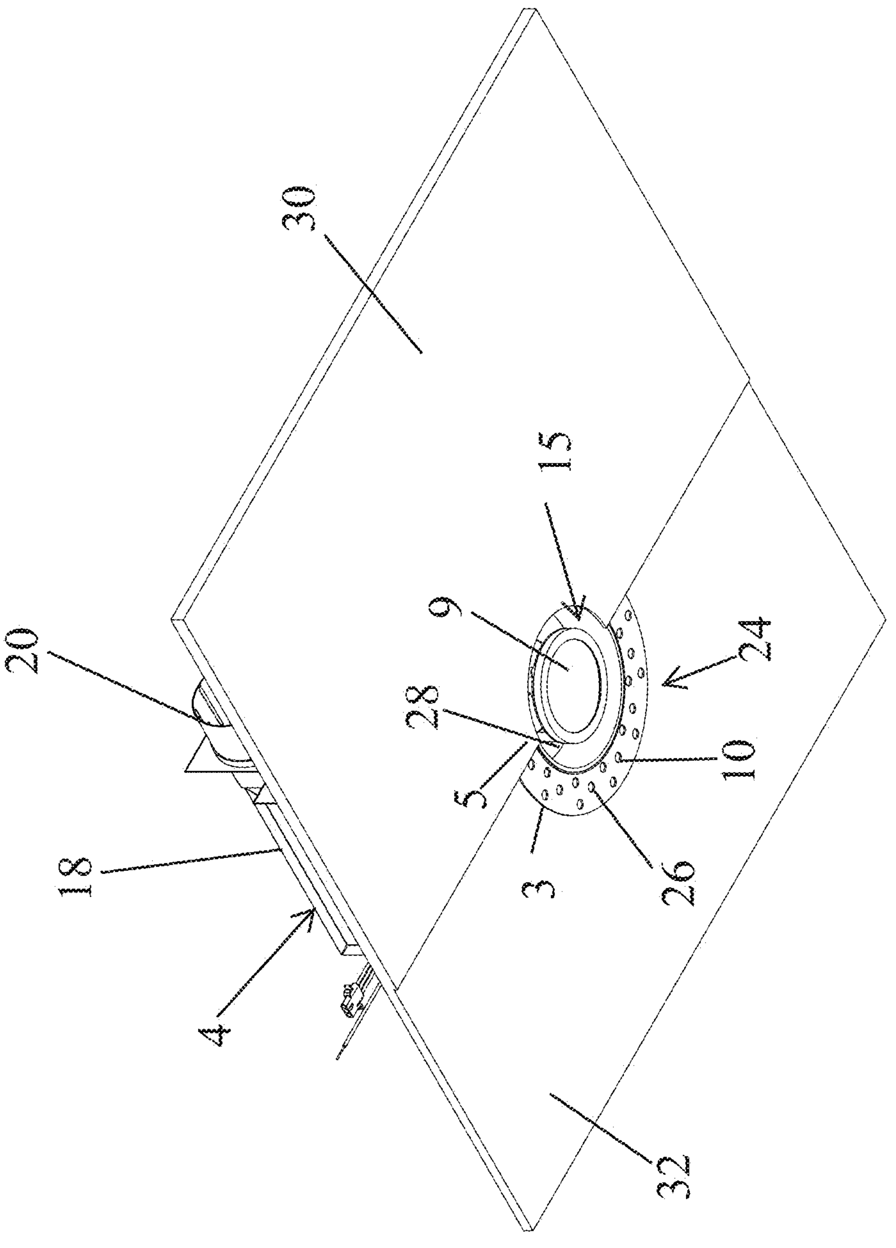
FIG. 11 is an inverted, perspective view of the fan grille of FIG. 3 partially installed in a ceiling.

Another embodiment of the invention could incorporate a semi-flush grille. In such an embodiment the integration flange 6 and 26 would not include through holes 10. Instead of through holes 10 the integration flanges 6 and 26 would simple be solid and flat. This different style of integration flange would not be installed with wall board compound 5 as shown in FIGS. 9-11. The integration flange would simply rest flush on the wall board 30. This would provide for a simple installation and still provide a flush installation. The light module 9 may still be planar and even with the wall board 30, or the light module 9 may be recessed into the wall board 30 and into the cutouts 32 and 40, shown in FIGS. 5 and 7. Such a configuration would still provide a clear air flow path through the openings 15.

Figure 12:
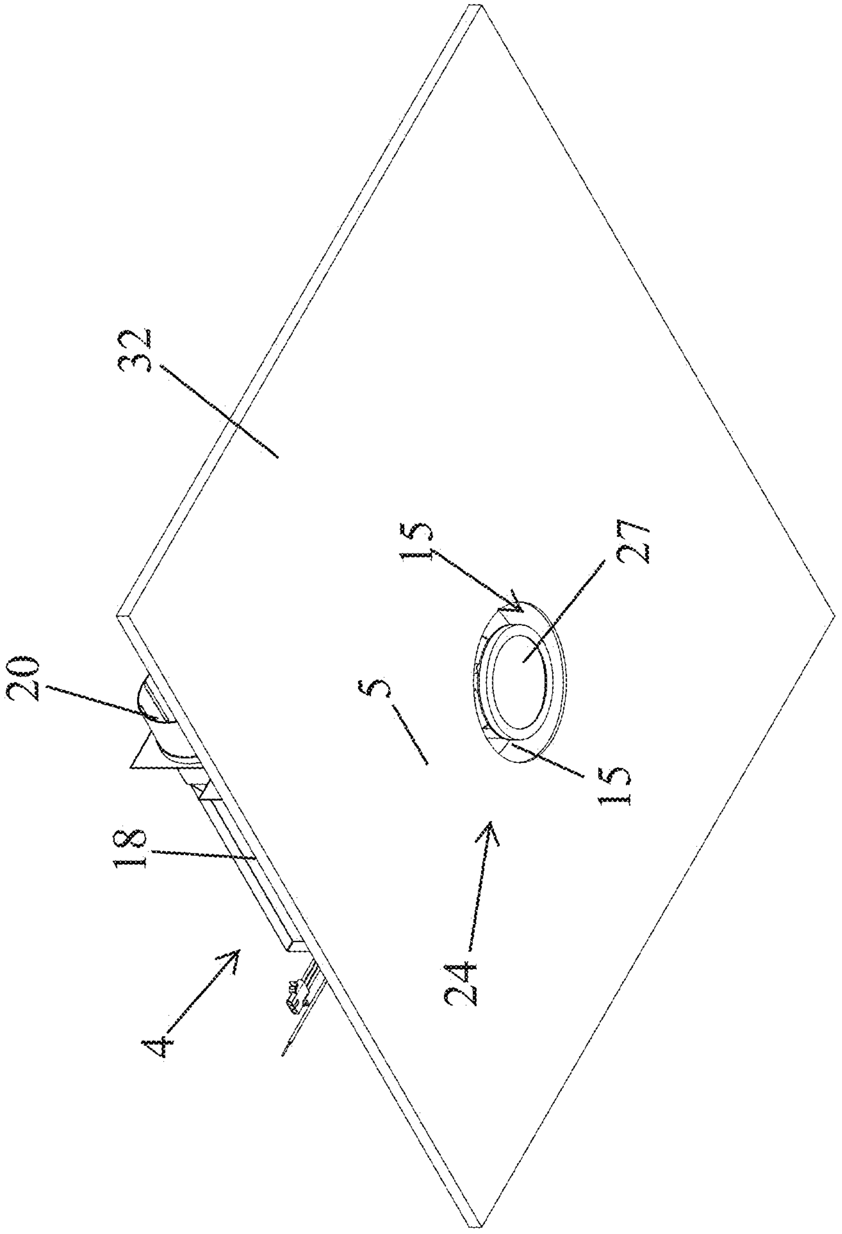
FIG. 12 is an inverted, perspective view of the fan grille of FIG. 3 fully installed in a ceiling.

FIGS. 11 and 12 show the circular and cylindrical embodiment of the grille 24. All the features and functions with respect to FIGS. 9 and 10 are the same with the grille 24 of FIGS. 11 and 12 but it is adapted for a circular installation.

While the present disclosure describes various exemplary embodiments, the disclosure is not so limited. To the contrary, the disclosure is intended to cover various modifications, uses, adaptations, and equivalent arrangements based on the principles disclosed. Further, this disclosure is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. It should be understood that the illustrated embodiments are exemplary only, and should not be taken as limiting the scope of the disclosure.

Headings and subheadings, if any, are used for convenience only and are not limiting. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

We claim:

1. An exhaust fan grille configured to be located in a ceiling adjacent to an exhaust fan housing, the exhaust fan grille comprising:

a planar integration flange forming a perimeter of the grille;

an insert configured to be removably located within the perimeter of the planar integration flange;

a light module configured to engage the insert and define an opening between a perimeter of the light module and the insert such that an exhaust fan can draw air into the fan housing through the opening.

2. The exhaust fan grille according to claim 1, further comprising a trim ring for attachment to the light module.

3. The exhaust fan grille according to claim 1, further comprising a plurality of receivers in the insert configured to accept and attach to the light module.

4. The exhaust fan grille according to claim 1, wherein the planar integration flange defining a plurality of through holes along the perimeter of the planar integration flange configured for attachment to a wall board with a wall board compound spread about the planar integration flange and into the through holes.

5. The exhaust fan grille according to claim 1, further comprising at least one spring attached to the insert on a first end and attached to the fan housing on a second end, wherein the at least one spring applies a force drawing the insert towards the fan housing.

6. The exhaust fan grille according to claim 5, wherein the at least one spring includes a first extension spring and a second extension spring.

7. The exhaust fan grille according to claim 1, wherein the insert is cylindrical and maintains the opening between the light module and insert in a uniformly circular shape around a face of the light module.

8. The exhaust fan grille according to claim 1, wherein the insert is rectangularly-shaped and maintains the opening between the light module and insert in a uniformly rectangular shape around a face of the light module.

9. An exhaust fan grille configured to be located in a ceiling adjacent to an exhaust fan housing, the exhaust fan grille comprising:

a planar integration flange forming a perimeter of the grille;

an insert configured to be removably located within the planar integration flange;

a light module configured to engage the insert and define an opening between a perimeter of the light module and the insert such that an exhaust fan can draw air into the fan housing through the opening; and wherein the light module is configured to be flush with the ceiling.

10. The exhaust fan grille according to claim 9, wherein the planar integration flange is configured for permanent attachment to a wall board with a wall board compound.

11. An exhaust fan grille comprising:

an integration flange defining a perimeter of the grille;

an insert extending from the integration flange, the insert defining a central portion;

a light module configured to be located within the central portion of the insert flush with the integration flange and defining an opening between the light module and the insert; and wherein the opening between the light module and the insert is configured to allow air to be drawn through the grille.

12. The exhaust fan grille of claim 11, wherein the integration flange defines a plurality of through holes configured for permanent attachment to a wall board with a compound concealing the through holes.

13. The exhaust fan grille of claim 11, wherein the insert is rectangular shaped and maintains the opening between the light module and insert in a uniformly rectangular shape around the light module.

14. The exhaust fan grille of claim 11, wherein the insert is cylindrical shaped and maintains the opening between the light module and insert in a uniformly circular shape around the light module.

15. The exhaust fan grille of claim 11, further comprising a spring having a first end attached to the insert and a second end configured to be attached to the fan housing.

16. The exhaust fan grille of claim 12, wherein the plurality of through holes are dispersed about the integration flange.

17. The exhaust fan grille of claim 11, the light module is attached to the insert by a plurality of receivers.

18. The exhaust fan grille of claim 11, further comprising a trim ring for attachment to the light module.

19. The exhaust fan grille of claim 15, wherein the spring is configured to bias the insert toward the fan housing.

20. The exhaust fan grille of claim 11, wherein the integration flange is planar.

* * * * *